United States Patent [19]
Yonezawa

[11] Patent Number: 5,927,700
[45] Date of Patent: Jul. 27, 1999

[54] TRANSMISSION DEVICE FOR A CLAMP

[75] Inventor: Keitaro Yonezawa, Kobe, Japan

[73] Assignee: Kabushiki Kaisha Kosmek, Hyogo, Japan

[21] Appl. No.: 09/119,008

[22] Filed: Jul. 20, 1998

[30] Foreign Application Priority Data

Jul. 23, 1997 [JP] Japan .................................. 9-196627
Sep. 2, 1997 [JP] Japan .................................. 9-236615

[51] Int. Cl.⁶ .................................................. B23Q 3/08
[52] U.S. Cl. ............................... 269/24; 269/25; 269/27
[58] Field of Search .............................. 269/24, 27, 32, 269/30, 25; 192/93 A; 74/107; 254/98

[56] References Cited

U.S. PATENT DOCUMENTS

| | | | |
|---|---|---|---|
| 1,704,031 | 3/1929 | Boehm ....................................... | 254/98 |
| 3,046,808 | 7/1962 | De Mart .................................. | 254/103 |
| 4,351,516 | 9/1982 | Ersoy et al. ............................... | 269/27 |
| 4,508,327 | 4/1985 | Ersoy ........................................ | 269/27 |
| 5,013,015 | 5/1991 | Fathree ..................................... | 269/24 |
| 5,108,079 | 4/1992 | Yonezawa et al. . | |

*Primary Examiner*—David A. Scherbel
*Assistant Examiner*—Lee Wilson
*Attorney, Agent, or Firm*—Bacon & Thomas, PLLC

[57] ABSTRACT

A clamp rod has an outer peripheral surface provided with a first concaved passage communicated in entirety of the outer peripheral surface and in the shape of sawtooth. The first concaved passage comprises first spiral grooves in the shape of a multi-start thread and communication grooves. A sleeve externally fitted onto the clamp rod has an inner peripheral surface provided with a second concaved passage corresponding to the first concaved passage. A number of rolling balls are charged between the first concaved passage and the second concaved passage. The clamp rod and the sleeve are moved in a direction of an axis relatively to each other, thereby rotating the clamp rod around the axis.

10 Claims, 12 Drawing Sheets

F I G. 9(A)
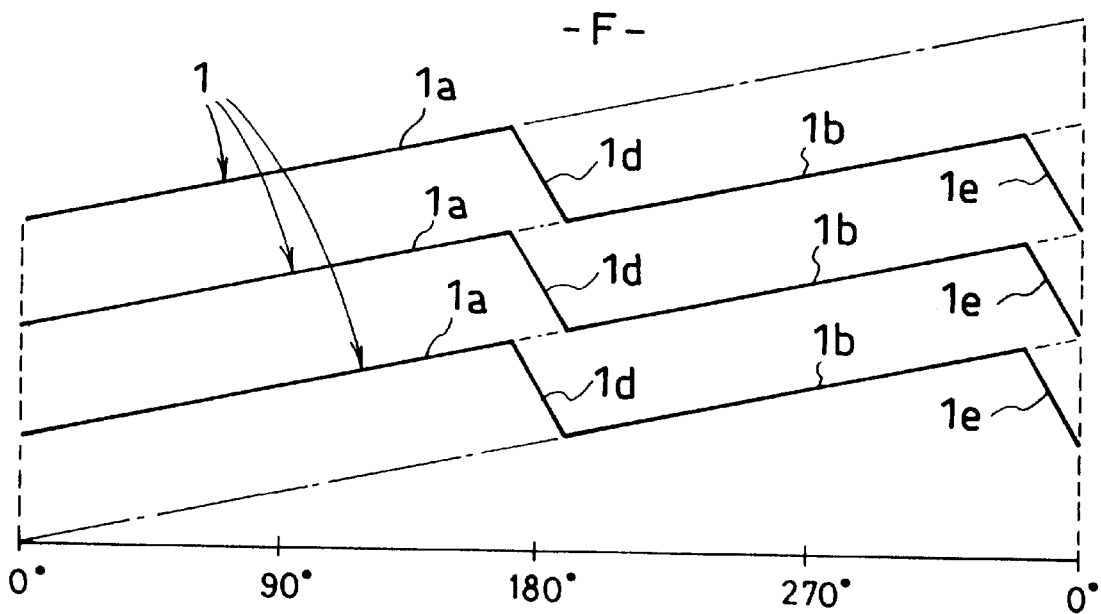
F I G. 9(B)
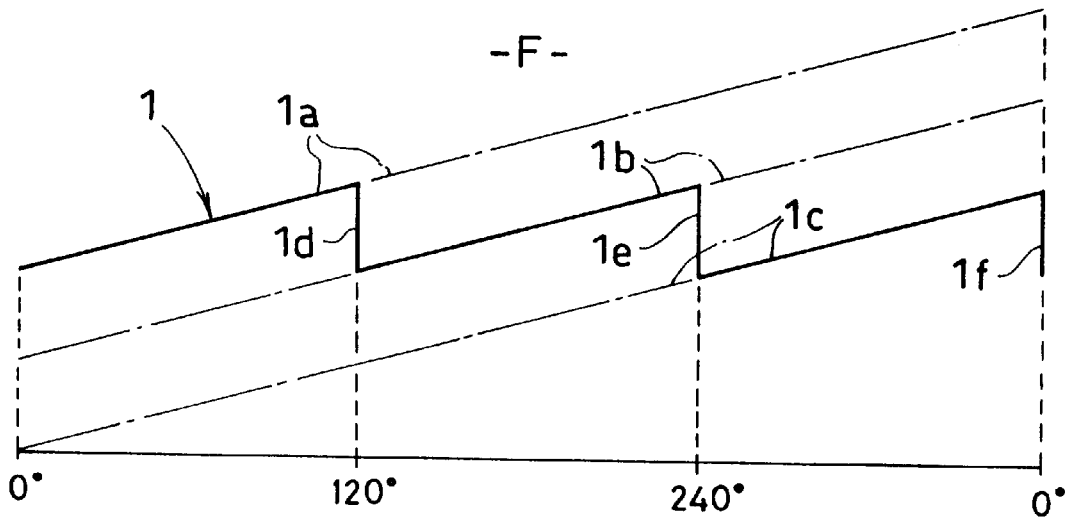

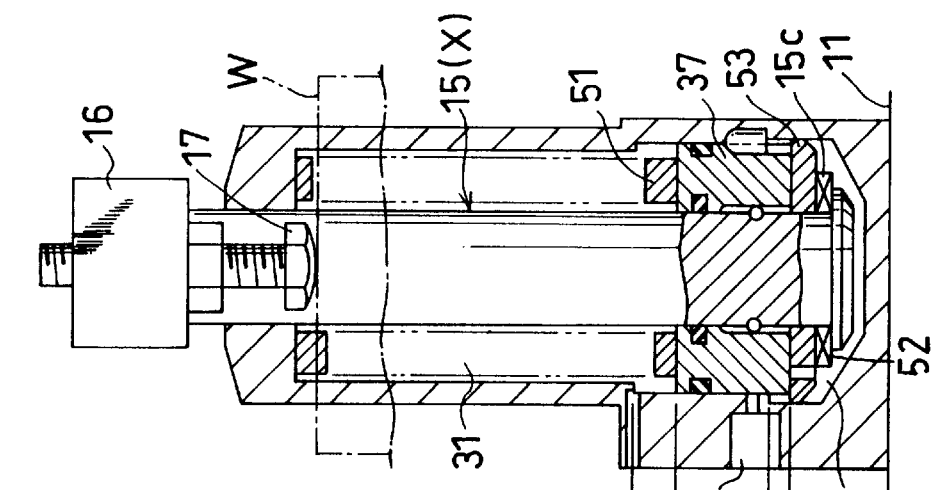
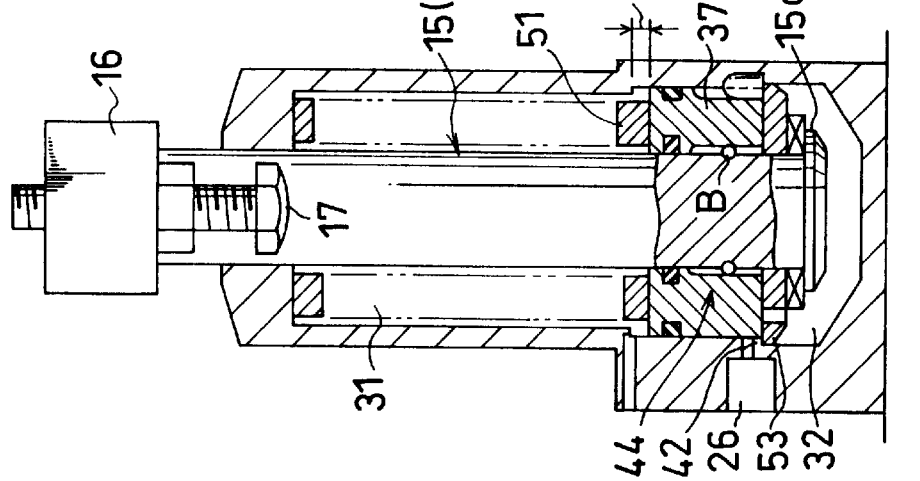
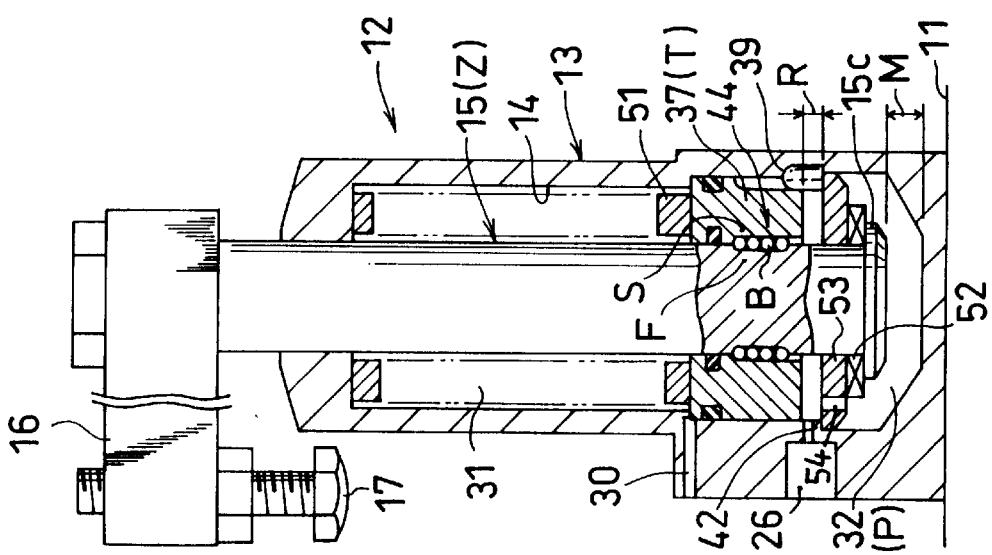

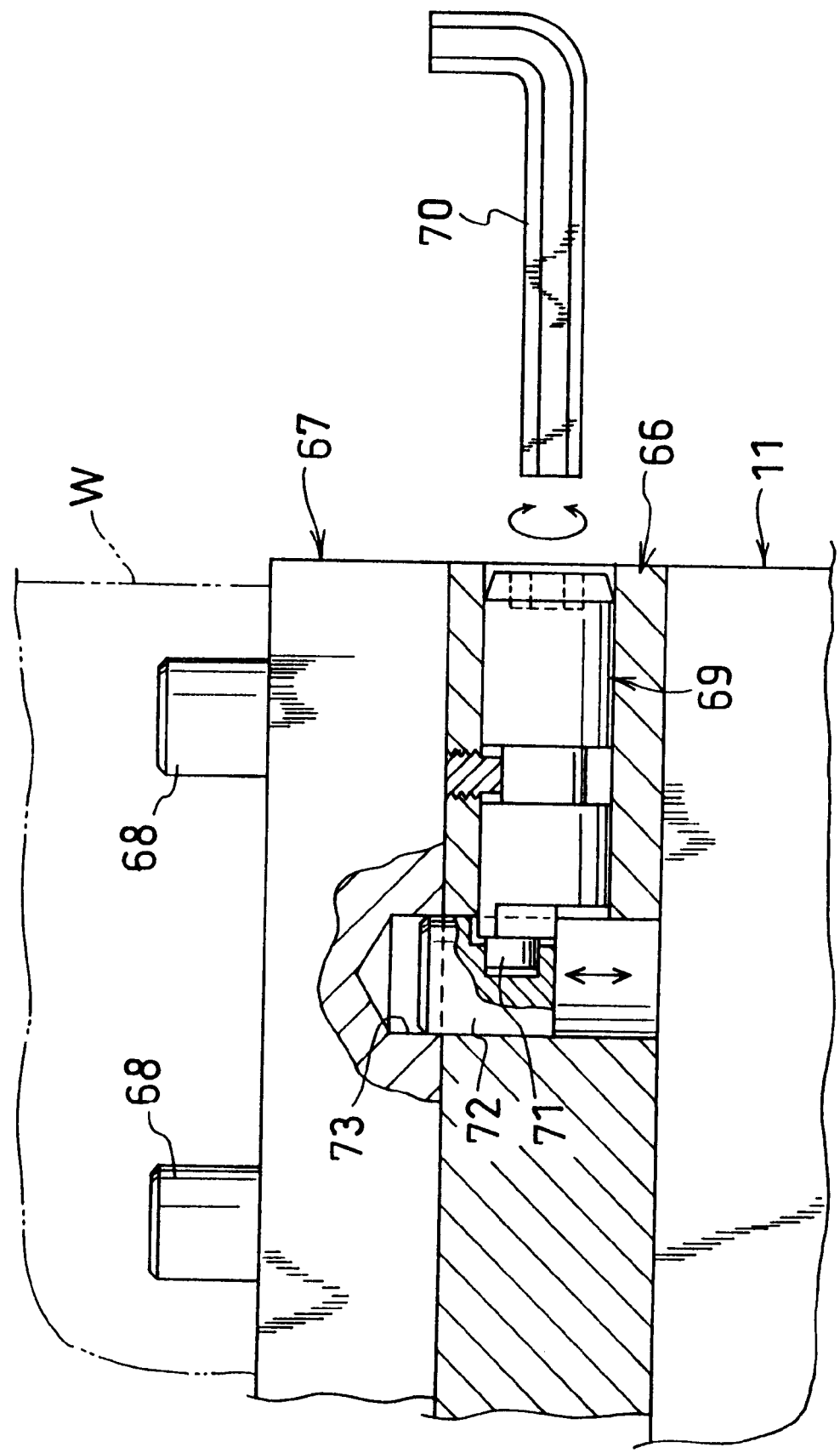

TRANSMISSION DEVICE FOR A CLAMP

BACKGROUND OF THE INVENTION

1. Technical Field

The present invention relates to a transmission device for converting a reciprocal linear movement to a rotary movement and more particularly to a transmission device suitable for rotating a clamp rod of a clamping apparatus or the like.

2. Description of the Earlier Technology

The present inventor proposed a clamping apparatus utilizing a transmission device of this type prior to the present invention (for example, Japanese Patent Appln. No. 8-190481). The transmission device disclosed in that previous proposal is constructed as follows.

A clamp rod has an outer peripheral surface provided with one round of a spiral groove. The spiral groove has a terminal end and an initial end communicated with each other through a communication groove in an axial direction. A sleeve externally fitted onto the clamp rod has an inner peripheral surface provided with another spiral groove corresponding to the spiral groove and with an escape groove corresponding to the communication groove. A number of rolling balls are charged between the groove of the clamp rod and that of the sleeve.

The transmission device disclosed in the previous proposal circulates the rolling balls in a peripheral direction while rolling them along the grooves when the clamp rod rotates. Therefore, it is excellent in that the frictional resistance becomes small enough to smoothly rotate the clamp rod.

However, it has been required to make the transmission device more compact so as to fulfill the recent need for downsizing the clamping apparatus.

SUMMARY OF THE INVENTION

The present invention has an object to provide a transmission device compact and highly durable.

In order to accomplish the above object, the invention as set forth in claim 1 has constructed a transmission device in the following manner, for example, as shown in FIGS. 1 to 7, FIG. 8(A) to FIG. 8(C), FIG. 9(A), FIG. 9(B), FIG. 10(A) to FIG. 10(C) or FIG. 11(A) to FIG. 11(E), respectively.

The transmission device comprises a first member (F) extending in a direction of an axis and a second member (S) externally fitted onto the first member (F), these two members (F) and (S) being adapted to move relatively to each other in the axial direction so as to rotate either of them (F, S) around the axis. The first member (F) has an outer peripheral surface provided with a first concaved passage (1) communicated in entirety of the outer peripheral surface and in the shape of sawtooth. The first concaved passage (1) comprises first spiral grooves (1a), (1b) shaping a multi-start thread and each formed by about one pitch, a pair of the adjacent first spiral grooves (1a, 1b) or (1b, 1a) having a terminal end and an initial end communicated with each other through a communication groove (1d) or (1e). The second member (S) has an inner peripheral surface provided with a second concaved passage (2) communicated in entirety of the inner peripheral surface. The second concaved passage (2) comprises second spiral grooves (2a), (2b) and escape grooves (2d),(2e), the second spiral grooves (2a),(2b) corresponding to the first spiral grooves (1a),(1b) and being spaced apart at a predetermined distance in a peripheral direction, the escape grooves (2d), (2e) corresponding to the communication grooves (1d), (1e) and being formed so as to extend in the peripheral direction. A number of rolling balls (B) are charged between the first concaved passage (1) and the second concaved passage (2).

In the above construction, as for the combination of movements of the first and second members (F) and (S), the following four ones are considered:

(a) For example, a case of rotating the first member (F) by axially pushing it relatively to the second member (S) as shown in FIG. 11(A);

(b) For example, a case of rotating the first member (F) by axially pushing the second member (S) relatively to the first member (F) as shown in FIG. 11(B);

(c) For example, a case of rotating the second member (S) by axially pushing it relatively to the first member (F) as shown in FIG. 11(C); and (d) For example, a case of rotating the second member (S) by axially pushing the first member (F) relatively to the second member (S) as shown in FIG. 11(D).

It is sufficient if both of the first and second members (F) and (S) can move relatively to each other in an axial direction. Both members may be adapted to move together in the axial direction as shown in FIG. 11(E).

The invention as defined in claim 1 functions in the following manner, for example, as shown in FIG. 7(A) to FIG. 7(C).

FIG. 7(A) is a developed view of the first member (F) when cutting it in a peripheral direction and seeing the cut section from inside. FIG. 7 (B) and 7(C) are developed views of the second member (S) when cutting it in the peripheral direction and seeing the cut section from inside. FIG. 7(B) shows the first member (F) rotated in a counter-clockwise direction when seen in plan. FIG. 7(C) illustrates the first member (F) rotated in a clockwise direction.

In a state shown by FIG. 7(B), the first member (F) is raised to a position (Z) indicated by a two-dot chain line relatively to the second member (S).

When the first member (F) is pushed downwards relatively to the second member (S), as shown in FIG. 7(C) the first member (F) rotates and descends along the second spiral grooves 2a and 2b in the clockwise direction when seen in plan. At the same time, a number of balls (B) smoothly circulate in the clockwise direction when seen in plan. More specifically, in FIG. 7(B), balls (B) in one escape groove 2d rotate in the clockwise direction when seen in plan to advance into the other escape groove 2e through one second spiral groove 2a, thereby pushing balls (B) in the other escape groove 2e into the other second spiral groove 2b.

The invention as defined in claim 1 has the following advantages.

As mentioned above, when the first member rotates, the rolling balls peripherally circulate while rolling along the spiral grooves. This makes the frictional resistance small when the first member rotate to result in a possibility of smoothly rotating it.

In addition, the first spiral grooves in the shape of the multi-start thread can shorten its pitch with the same lead when compared with the spiral groove in the shape of a single-start thread disclosed in the above-mentioned previous proposal. For example, with a double-start thread, its pitch becomes half the pitch of the previous proposal. And with a triple-start thread, its pitch becomes one third the pitch of the previous proposal.

Accordingly, the transmission device of the present invention can secure a necessary lead angle to smoothly rotate the first member and at the same time shorten an axial length of the first member. As a result, the transmission device can be reduced in height and therefore made compact.

Further, the second member has a plurality of escape grooves arranged peripherally, so that they can support the outer peripheral surface of the first member well balanced peripherally. This can prevent the first member from inclining and biasedly wearing off due to eccentric load, which result in a possibility of using the transmission device over a long period of time with maintenance free.

BRIEF DESCRIPTION OF THE DRAWINGS

FIGS. 1 to 8 illustrate a first embodiment of the present invention;

FIG. 1 is a vertical sectional view showing a clamping apparatus which uses a transmission device according to the present invention when it is retreated;

FIG. 2 is a vertical sectional view showing the clamping apparatus unclamped;

FIG. 3 is a vertical sectional view of the clamping apparatus clamped;

FIG. 4 is a plan view of FIG. 1;

FIG. 5(A) is an elevation view of the first member;

FIG. 5(B) is an end view when seen along a line B—B in a direction indicated by arrows in FIG. 5(A);

FIG. 5(C) is a developed view of the first member when seen in elevation;

FIG. 5(D) is a schematic view of FIG. 5(C);

FIG. 6(A) idea plan view;

FIG. 6(B) is a sectional view when seen along a line B—B in a direction indicated by arrows in FIG. 6(A);

FIG. 6(C) is a developed view when cutting the sleeve along a line VI in FIG. 6(A) and seeing the cut section from inside;

FIG. 7(A) is a developed view of the first member when seen from its inside and corresponds to FIG. 6(C);

FIG. 7 shows the clamp rod changed over to a retreated position;

FIG. 7(C) shows the clamp rod changed over to an unclamping position;

FIG. 8(A) corresponds to FIG. 6(A);

FIG. 8(B) corresponds to FIG. 7(C);

FIG. 8(C) is an enlarged view of a principal portion of FIG. 8(A);

FIG. 9(A) shows another modification of the present invention and corresponds to FIG. 5(D);

FIG. 9(B) shows still another modification of the present invention and corresponds to FIG. 5(D);

FIGS. 10(A) to 10(C) show a second embodiment of the present invention;

FIG. 10(A) corresponds to FIG. 1;

FIG. 10(B) corresponds to FIG. 2;

FIG. 10(C) corresponds to FIG. 3;

FIG. 12 shows a structure of attaching a jig plate to be used for the clamping apparatus.

DESCRIPTION OF THE PREFERRED EMBODIMENTS

A first embodiment of the present invention is explained with reference to FIGS. 1 to 8.

Figure 1:
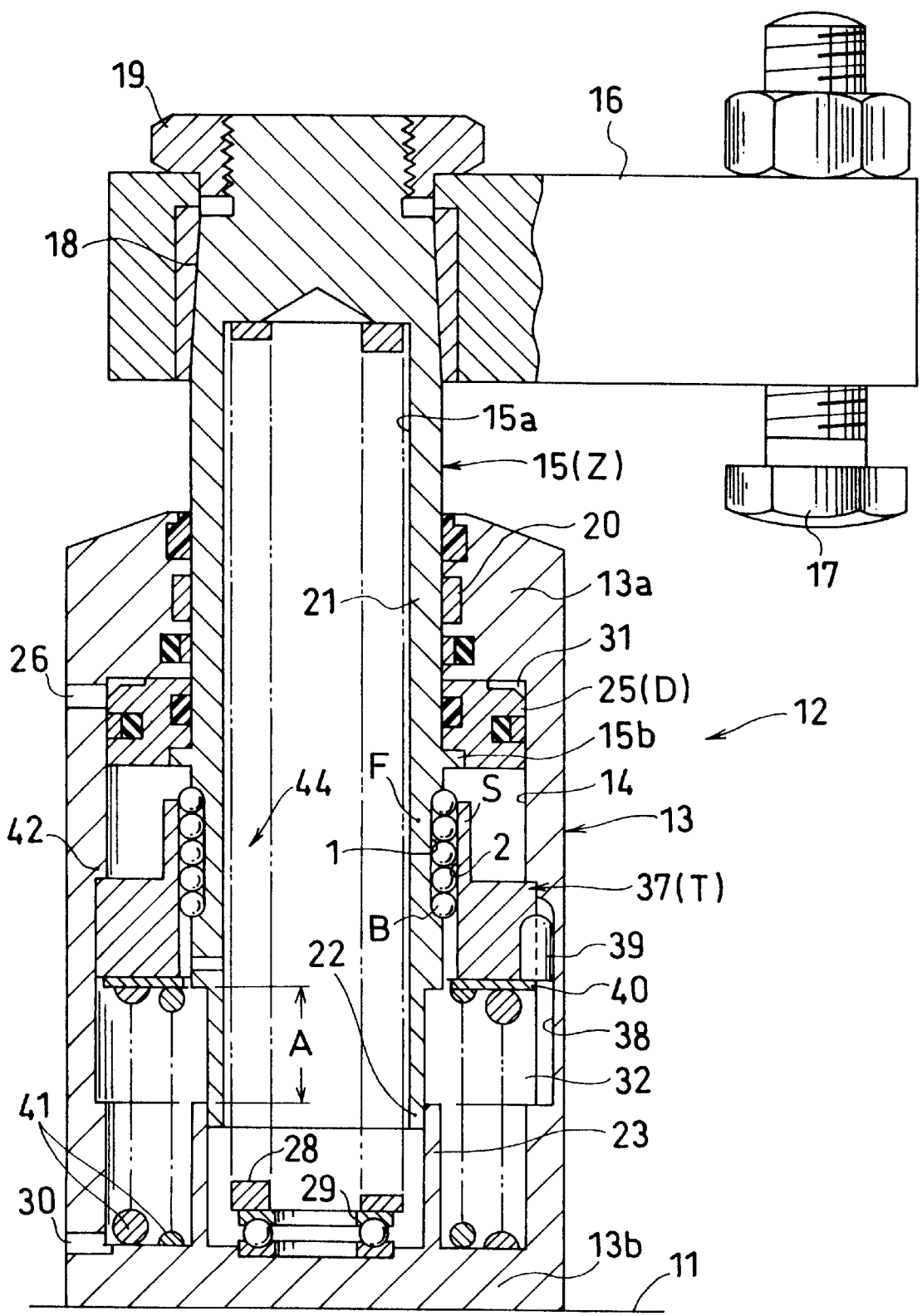
Figure 4:
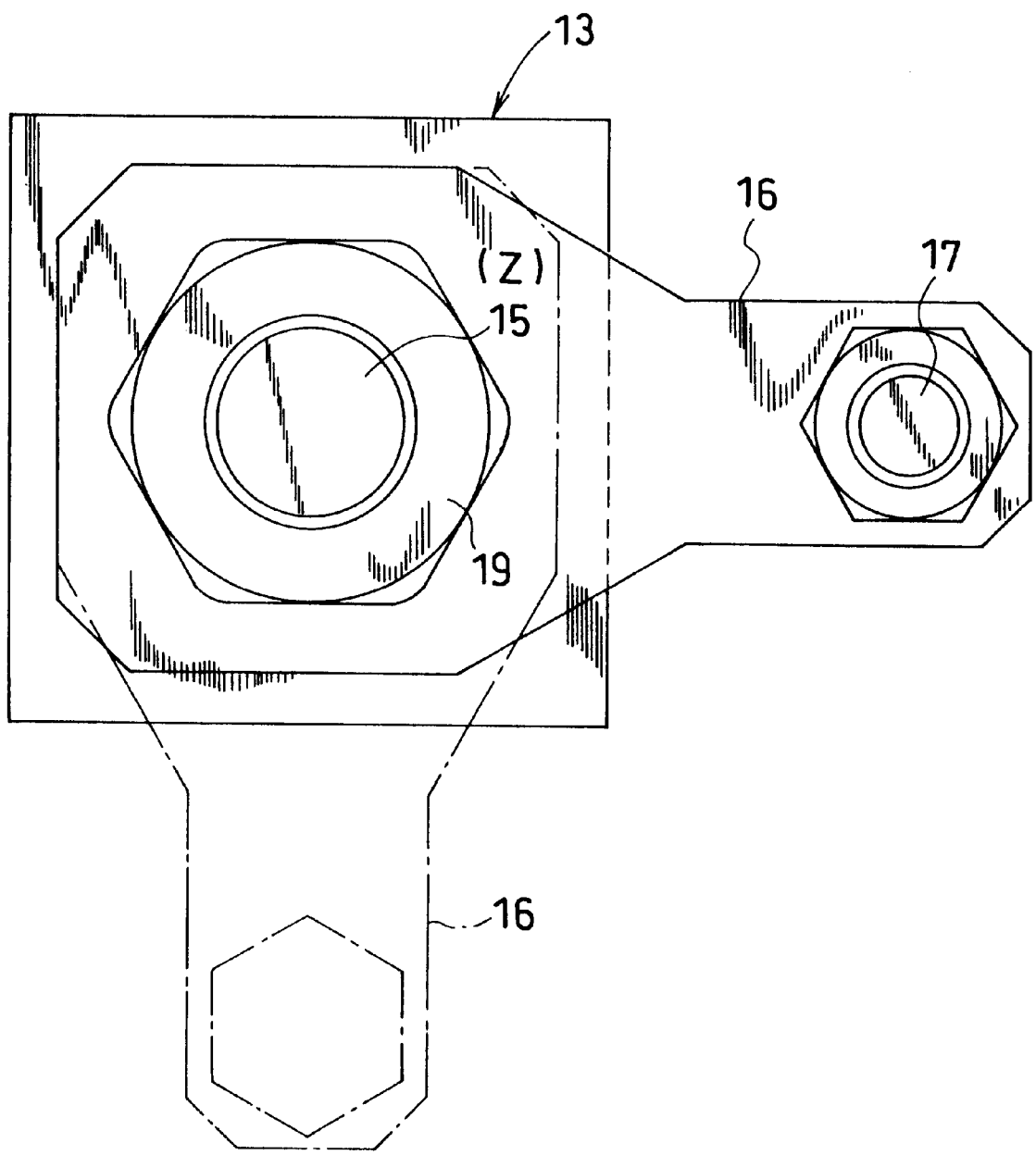

First, outline of a clamping apparatus utilizing a transmission device of the present invention is explained by relying on FIGS. 1 and 4. FIG. 1 is a vertical sectional view showing the clamping apparatus retreated. FIG. 4 is a plan view of FIG. 1.

A housing 13 of a clamping apparatus 12 is fixed to a table 11 of a machine tool by a plurality of bolts (not shown). A cylindrical clamp rod 15 is inserted into a guide bore 14 within the housing 13. The clamp rod 15 has an upper end portion provided with an arm 16 projecting radially. The arm 16 is provided at its leading end portion with a push bolt 17. The arm 16 is engaged with a tapered surface 18 of the clamp rod 15 and fixed by a nut 19 at a predetermined rotation position.

The housing 13 has an upper end wall 13a to which a guide bush 20 is attached. The guide bush 20 supports an upper sliding portion 21 of the clamp rod 15 slidably. Further, the housing 13 has a lower end wall 13b provided with a guide cylinder 23. The guide cylinder 23 supports a lower sliding portion 22 of the clamp rod 15 slidably.

A means (D) for driving the clamp rod 15 is constructed as follows.

An annular piston 25 is externally fitted onto the clamp rod 15 between the upper sliding portion 21 and the lower sliding portion 22. The piston 25 is hermetically inserted into the guide bore 14. Here the piston 25 is formed separately from the clamp rod 15 but it may be integrally formed therewith.

Formed between the upper end wall 13a and the piston 25 is a first chamber 31 for clamping. Pressurized oil can be supplied to and discharged from the first chamber 31 through a pressurized oil supply and discharge port 26. Additionally, formed between the lower end wall 13b and the piston 25 is a second chamber 32 for unclamping. An unclamping spring 28 attached within the second chamber 32 urges the clamp rod 15 upward. More specifically, the unclamping spring 28 is inserted in a hollow portion 15a of the clamp rod 15 and has an upper end brought into butting contact with an upper portion of the clamp rod 15. The spring 28 has a lower end received by a thrust bearing 29. The second chamber 32 communicates with the atmosphere through a breather passage 30.

A transmission device (T) for rotating the clamp rod 15 is constructed as follows.

A sleeve 37 is vertically movably but unrotatably inserted into an annular space defined by an outer peripheral surface of the clamp rod 15 and the guide bore 14 between the piston 25 and the lower sliding portion 22. More concretely, a detent pin 39 is interposed between a vertical groove 38 formed in the guide bore 14 and the sleeve 37. A support ring 40 prevents the detent pin 39 from falling down.

The sleeve 37 is urged upward by a pushing spring 41 composed of two coil springs. A stopper 42 comprising a stepped portion of the guide bore 14 inhibits the sleeve 37 from moving upward further than a predetermined distance. The pushing spring 41 has an urging force set to substantially the same value as that of the unclamping spring 28.

A converting mechanism 44 is provided over an inner peripheral surface of the sleeve 37 and the outer peripheral surface of the clamp rod 15. The converting mechanism 44 is adapted to convert an axial reciprocal movement of the clamp rod 15 to a rotary movement, although explained later in detail.

Figure 2:
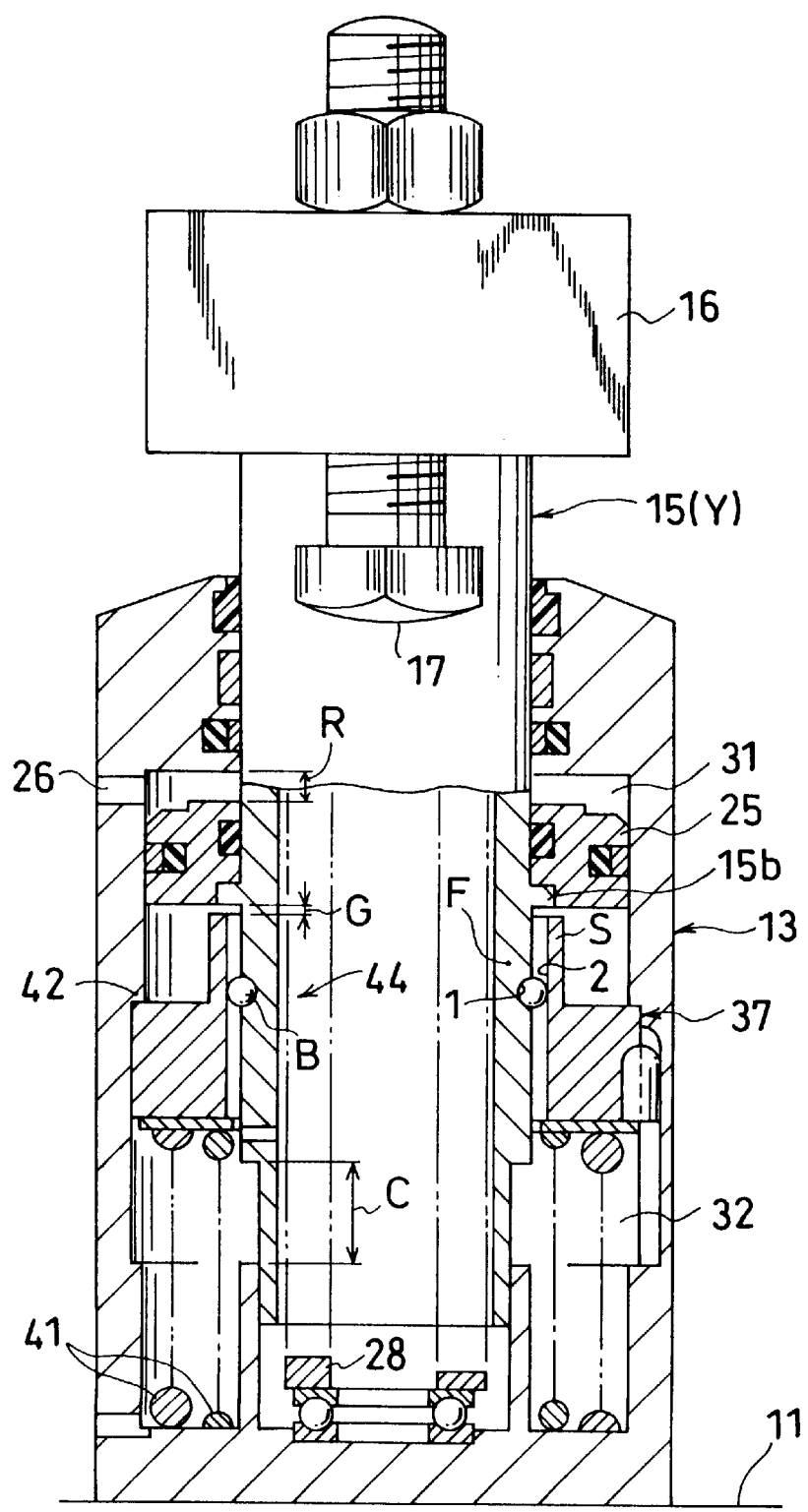
Figure 3:
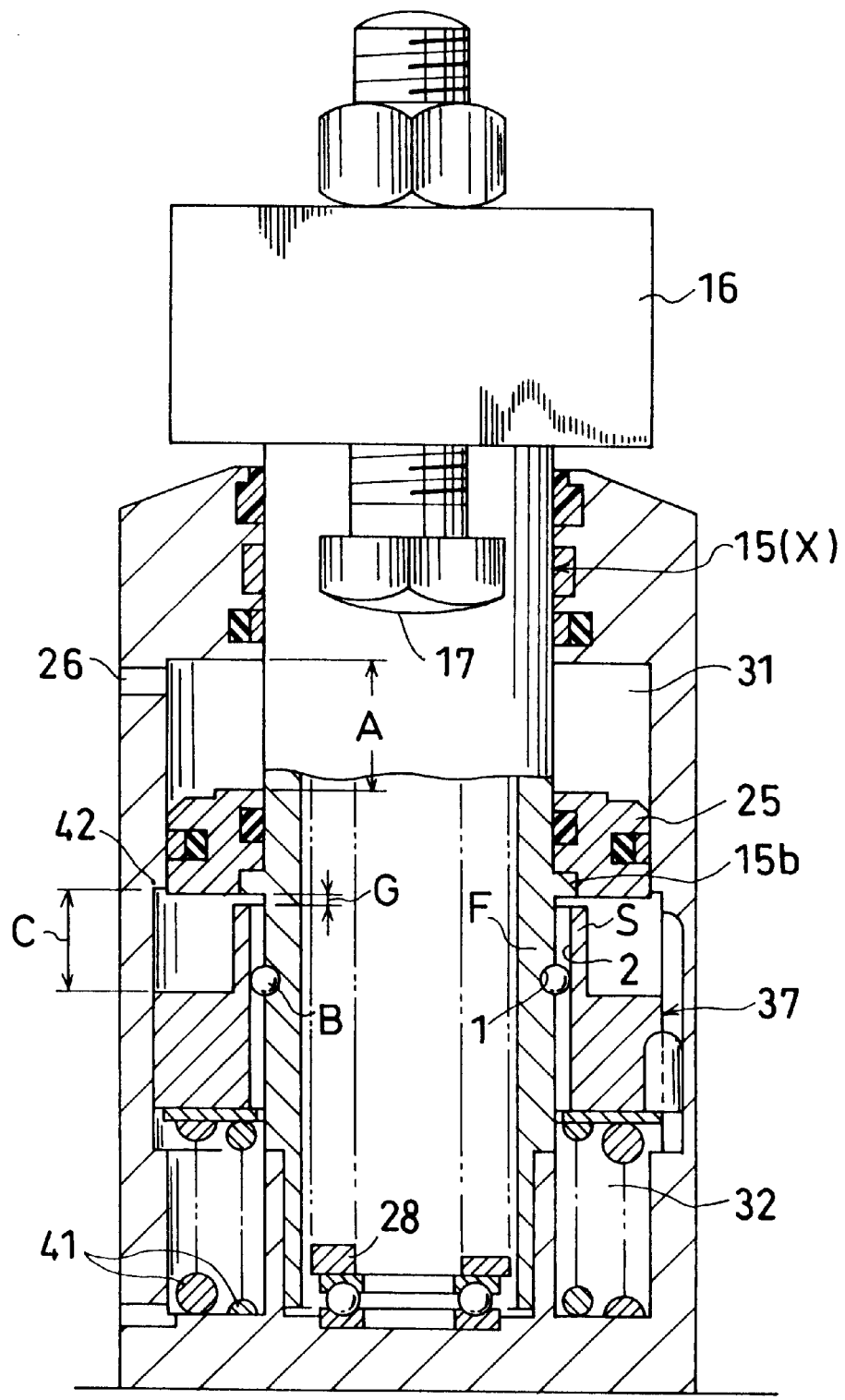

Operation of the clamping apparatus 12 is explained by relying on FIGS. 1, 2 and 3. In the respective Figures, characters (A), (C) and (R) indicate a whole stroke, a clamping stroke and a rotation stroke, respectively.

When switching over a retreated condition of FIG. 1 to a clamping condition of FIG. 3 via an unclamping condition of FIG. 2, firstly pressurized oil is supplied to the first chamber 31 for clamping in the retreated condition of FIG. 1.

Then the piston 25 pushes down a flange portion 15b of the clamp rod 15 and the converting mechanism 44 lowers the clamp rod 15 while rotating it. And as shown in FIG. 2, when the piston 25 and the flange portion 15b are lowered by the rotation stroke (R), the clamp rod 15 is switched over to an unclamping position (Y). An under surface of the lowered flange portion 15b defines a gap (G) with an upper end surface of the sleeve 37.

Next, the piston 25 lowers the sleeve 37 against the pushing spring 41 by a force of the pressurized oil in the first chamber 31, thereby switching over the clamp rod 15 to a clamping position (X) shown in FIG. 3.

When switching over the clamping condition of FIG. 3 to the retreated condition of FIG. 1 via the unclamping condition of FIG. 2, the pressurized oil in the first chamber 31 is discharged in the clamping condition of FIG. 3.

Then the urging force of the unclamping spring 28 and that of the pushing spring 41 move the clamp rod 15 and the sleeve 37 upward. And as shown in FIG. 2, the sleeve 37 goes up by the clamping stroke (C) to be received by the stopper 42, thereby switching over the clamp rod 15 to the unclamping position (Y).

Subsequently, since the clamp rod 15 is pushed upward by the urging force of the unclamping spring 28, it goes up while being rotated by the converting mechanism 44 to be switched over to a retreated position (Z) of FIG. 1.

Next, a concrete structure of the converting mechanism 44 is explained by resorting to FIGS. 5 and 6.

Figure 5A:
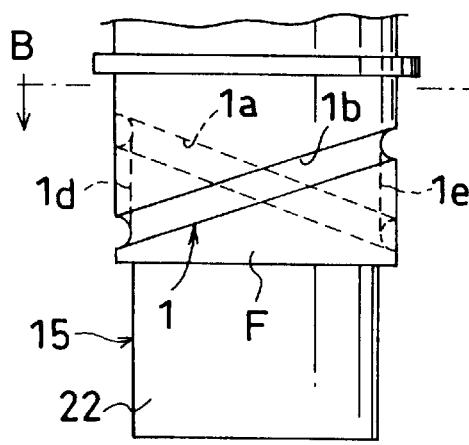
FIGS. 5(A) to 5(D) show a first member provided in a clamp rod of the clamping apparatus.
Figure 5B:
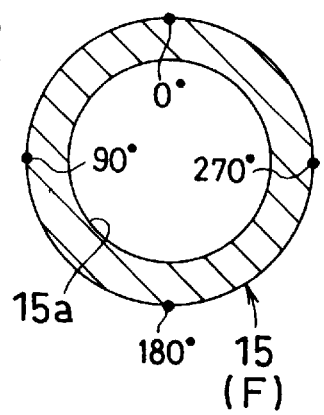
Figure 5C:
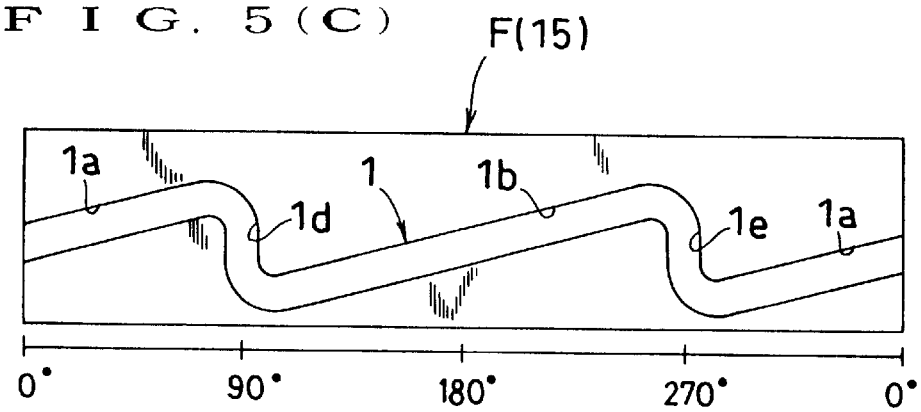
Figure 5D:
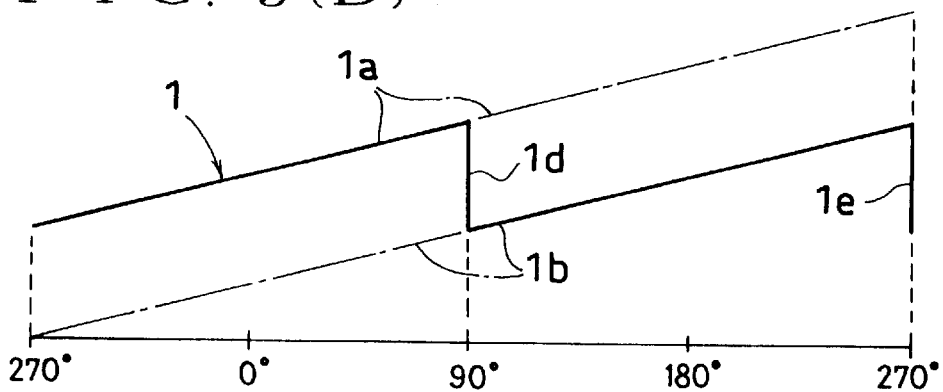
Figure 6A:
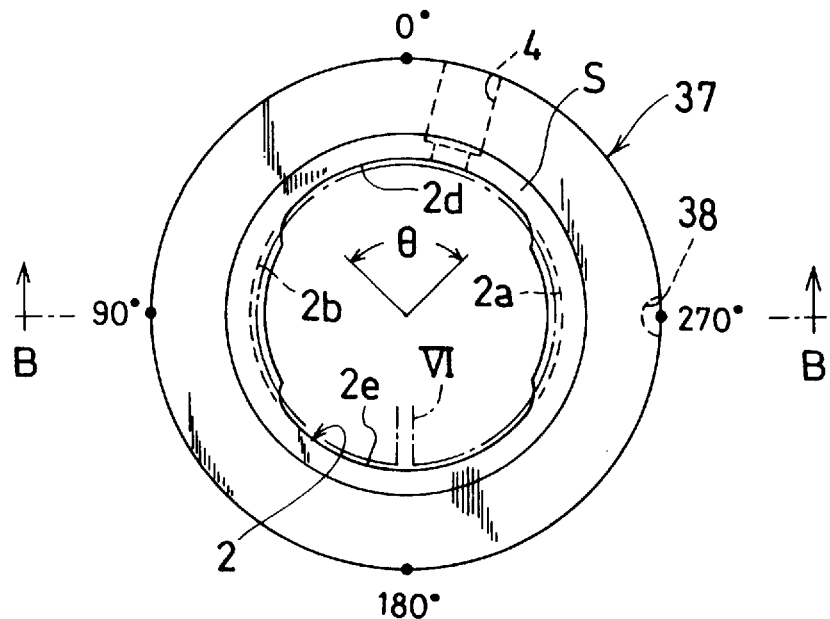
FIGS. 6(A) to 6(C) show a sleeve to be externally fitted onto the clamp rod.
Figure 6B:
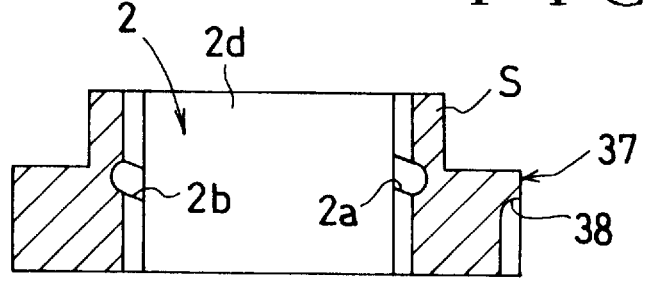
Figure 6C:
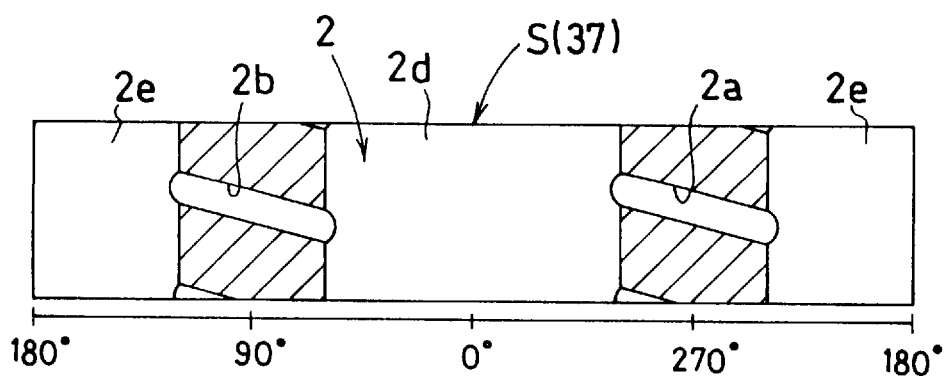

FIG. 5(A) is an elevation view of a first member (F) provided in the outer peripheral surface of the clamp rod 15. FIG. 5(B) is an end view when seen along a line B—B in a direction indicated by arrows in FIG. 5(A). FIG. 5(C) is a developed view of the first member (F) when seen in elevation. FIG. 5(D) is a schematic view of FIG. 5(C). FIG. 6(A) is a plan view of the sleeve 37. FIG. 6(B) is a sectional view when seen along a line B—B in a direction indicated by arrows in FIG. 6(A). FIG. 6(C) is a developed view of a second member (S) of the sleeve 37 when cutting it along a line VI in FIG. 6(A) and seeing the cut section of the second member (S) from inside.

As shown in FIGS. 5(A) to FIG. 5(D), the first member (F) provided in the clamp rod 15 has an outer peripheral surface formed with a first concaved passage 1 communicated peripherally in the shape of sawtooth. The first concaved passage 1 comprises two first spiral grooves 1a and 1b formed in the shape of a double-start thread and two axially extending communication grooves 1d and 1e.

Each of the first spiral grooves 1a and 1b is formed peripherally in a range of about 180 degrees by about one pitch. And while one first spiral groove 1a has a terminal end communicated with an initial end of the other first spiral groove 1b by one communication groove 1d, the other first spiral groove 1b has a terminal end communicated with an initial end of the one first spiral groove 1a by the other communication groove 1e.

Further, as shown in FIG. 6(A) to FIG. 6(C), the second member (S) provided in the sleeve 37 has an inner peripheral surface provided with a second concaved passage 2 communicated peripherally. The second concaved passage 2 comprises two second spiral grooves 2a and 2b corresponding to the two first spiral grooves 1a and 1b and two escape grooves 2d and 2e corresponding to the two communication grooves 1d and 1e.

More specifically, the two second spiral grooves 2a and 2b are each formed peripherally in a range of about 90 degrees and arranged to face each other. Further, the escape grooves 2d and 2e are each formed in a length corresponding to about 90 degrees, a rotation angle (θ) of the clamp rod 15 and arranged to face each other as well.

And as shown in the above-mentioned FIGS. 1 to 3 (and FIG. 7 to be mentioned later), a number of steel rolling balls (B) are charged between the first concaved passage 1 and the second concaved passage 2. Numeral 4 in FIG. 6(A) designates a ball charging inlet.

Figure 7A:
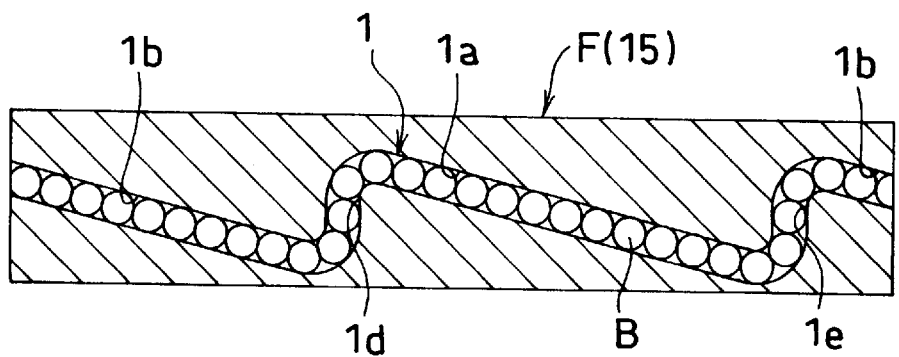
FIGS. 7(A) to 7(C) show views explaining the operation of the first member provided in the clamp rod and a second member provided in the sleeve.
Figure 7B:
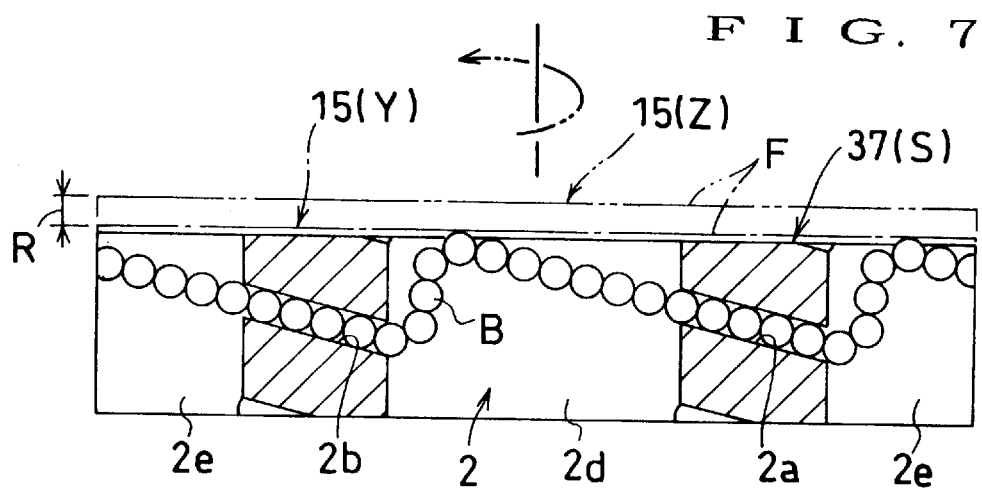
Figure 7C:
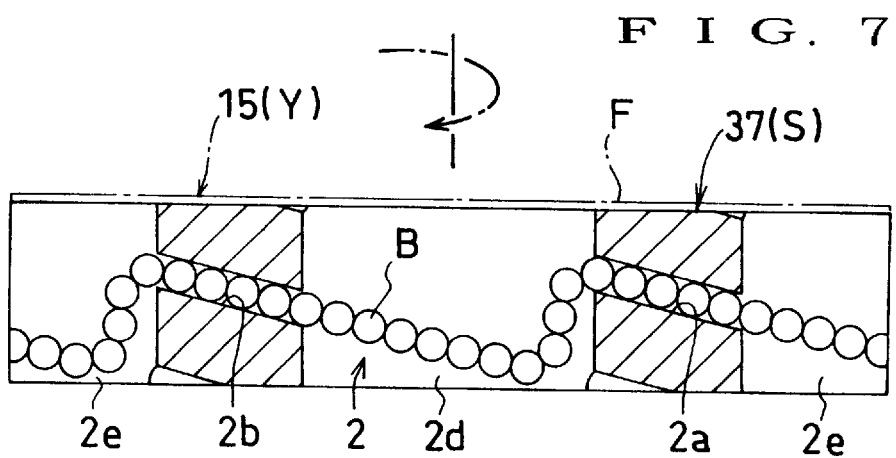

Operation of the converting mechanism 44 is explained by relying on FIG. 7 with reference to FIGS. 5 and 6. FIG. 7(A) is a developed view of the first member (F) when seen from inside and corresponds to FIG. 6(C). FIG. 7(B) shows both the clamp rod 15 and the first member (F) changed over to the retreated position (Z). FIG. 7(C) illustrates both the clamp rod 15 and the first member (F) changed over to the unclamping position (Y).

In the retreated condition of FIG. 7(B), the clamp rod 15 is raised to the retreated position (Z) shown by a two-dot chain line relatively to the sleeve 37. The first member (F) of the clamp rod 15 is rotated in a counterclockwise direction when seen in plan (see FIG. 7(A)).

On pushing the clamp rod 15 downward relatively to the sleeve 37, the first member (F) goes down along the second spiral grooves 2a and 2b of the sleeve 37 while rotating in a clockwise direction when seen in plan as shown in FIG. 7(c). At the same time, a number of balls (B) circulate in the clockwise direction when seen in plan to thereby switch over the clamp rod 15 to the unclamping position (Y) indicated by a one-dot chain line. When explaining the circulation of balls in more detail, balls (B) within one escape groove 2d in FIG. 7(B) are adapted to rotate in the clockwise direction when seen in plan to advance into the other escape groove 2e via one second spiral groove 2a, thereby pushing balls (B) within the other escape groove 2e into the other second spiral groove 2b.

The clamp rod 15 is switched over from the unclamping position (Y) of FIG. 7(C) to the retreated position (Z) of FIG. 7(B) through procedures substantially opposite to the above-mentioned ones.

The escape grooves 2d and 2e each receives by its peripheral edge at least axially rising one of the balls (B) rotated to the position of FIG. 7(C) and prevents it from further rotating in the clockwise direction when seen in plan. Therefore, as shown in FIG. 2, the under surface of the flange portion 15b of the clamp rod 15 defines the gap (G) together with the upper end surface of the sleeve 37.

The escape grooves 2d and 2e may be adapted so as not to receive the balls (B) by their peripheral edges. In this case, when the flange portion 15b is brought into butting contact with the sleeve 37 to remove the gap (G), the balls (B) stop circulating and the clamp rod 15 stops rotating.

The first embodiment has the following advantages.

Since the converting mechanism 44 does not apply excessive force on each ball (B), only a small number of balls (B) are required, which entails a possibility of making it compact and simple. More concretely, while only the urging force of the pushing spring 41 acts on the balls (B) between the unclamping condition of FIG. 2 and the clamping condition of FIG. 3, merely the urging force of the unclamping spring 28 acts on each of the balls (B) between the unclamping condition of FIG. 2 and the retreated condition of FIG. 1. In either case, excessive force does not act on the balls (B).

The converting mechanism 44 is constructed as a rolling-ball type and therefore produces only a small frictional resistance at the time of rotation. Owing to this construction, it is possible to smoothly rotate the clamp rod 15 and reduce a lead of each of the first spiral grooves 1a and 1b of the first concaved passage 1. As a result, the rotation stroke (R) can be reduced, which results in decreasing a vertical installation space of the clamping apparatus 12.

Besides, the first spiral grooves 1a and 1b are formed in the shape of the double-start thread. Accordingly, when compared with that of a single-start thread, its pitch can become half with the same lead. This can secure a necessary lead angle and at the same time halve an axial length of the first member (F).

In consequence, it is possible to smoothly rotate the clamp rod 15 and besides further decrease the vertical installation space of the clamping apparatus 12.

The sleeve 37 has two escape grooves 2d and 2e provided peripherally, so that the outer peripheral surface of the first member (F) of the clamp rod 15 can be supported peripherally in a good balance. This can prevent the first member (F) from inclining or biasedly wearing off due to eccentric load. As a result, it is possible to use the clamping apparatus over a prolonged period of time with maintenance free.

Figure 8A:
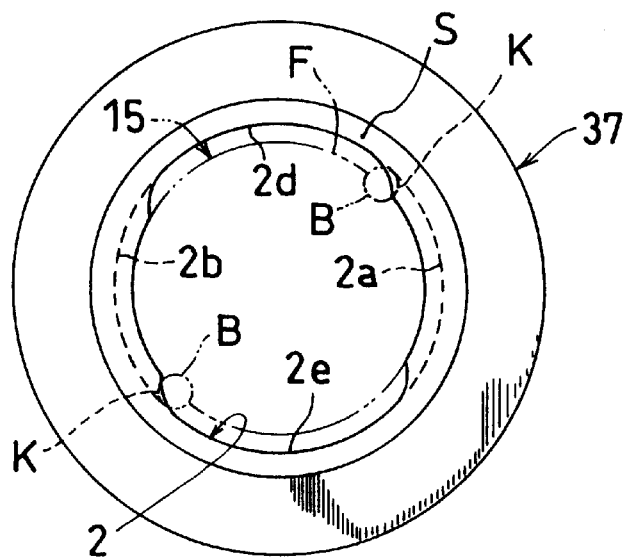
FIGS. 8(A) to 8(C) show a modification of the sleeve.
Figure 8B:
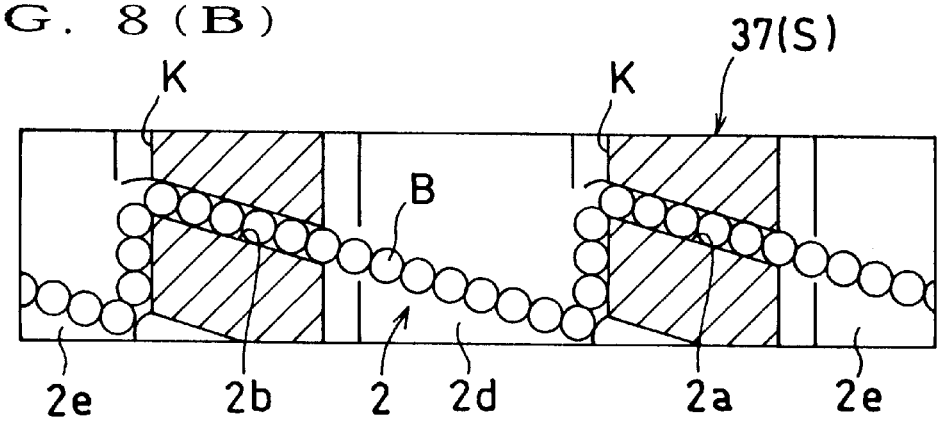
Figure 8C:
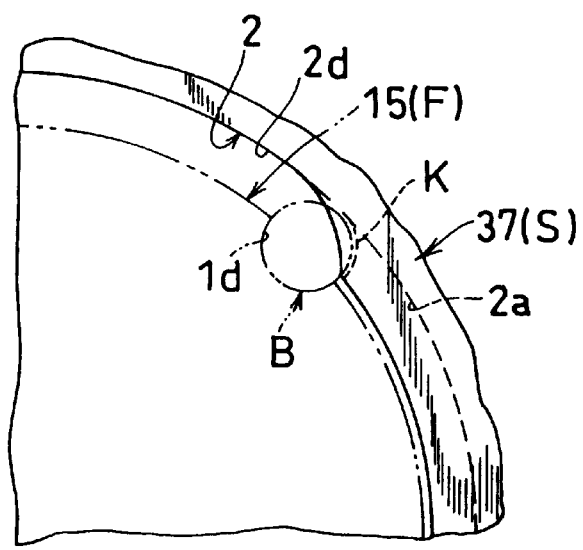

FIG. 8 shows a modification of the sleeve 37. FIG. 8(A) corresponds to FIG. 6(A). FIG. 8(B) corresponds to FIG. 7(C). FIG. 8(C) is an enlarged view of a portion in FIG. 8(A).

In this modification, each of the escape grooves 2d and 2e of the sleeve 37 is provided with a stopper wall (K) at a peripheral edge portion of its terminal end side. The stopper wall (K) has an arc-shaped ball receiving surface formed with a curvature radius which is substantially the same as a radius of the ball (B) and extending in the axial direction.

This stopper wall (K) is adapted to reliably receive a plurality of balls (B) (here three balls (B)) rising within each of the communication grooves 1d and 1e (here not shown) of the first concaved passage 1 when rotating the clamp rod 15 from the retreated position to the unclamping position.

The stopper wall (K) can repeatedly stop the clamp rod 15 at the same position through the balls (B), which results in stopping its rotation with a high accuracy. Further, the stopper wall (K) being arranged every 180 degrees in the peripheral direction, it can support the clamp rod 15 in a good balance. Accordingly, even if the outer peripheral surface of the clamp rod 15 is spaced apart from the inner peripheral surface of the sleeve 37 with a large clearance interposed therebetween, it is possible to prevent the clamp rod 15 from causing misalignment and keep an improved accuracy in stopping its rotation.

The stopper wall (K) may be provided at an edge portion of an initial end side of each of the escape grooves 2d and 2e in a direction of clamp rotation additionally to (or instead of) that provided at the edge portion of its terminal end side in the direction of clamp rotation. This can enhance the accuracy of stopping the clamp rod 15 at the retreated position.

FIG. 9(A) and FIG. 9(B) show other modifications, respectively and correspond to FIG. 5(D). These modifications will be explained with the same characters attached to those elements having the same functions as mentioned with reference to FIG. 5(D).

In a modification shown by FIG. 9(A), the communication grooves 1d and 1e are inclined and the first member (F) has three first concaved passages 1 axially provided. Although not shown, the sleeve is provided with three second concaved passages corresponding to the three first concaved passages 1. These first and second concaved passages may be each provided in two pairs or at least 4 pairs.

As mentioned above, since the number of the balls to be charged can be largely increased by forming each of the first and second concaved passages into a multi-stage structure, it is possible to manufacture a device of such a type as receiving a clamping force or the like external forces by balls.

In a modification shown in FIG. 9(B), the first concaved passage 1 comprises three first spiral grooves 1a, 1b and 1c formed in the shape of a triple-start thread and three communication grooves 1d, 1e and 1f. Although not shown, the sleeve is provided with a second concaved passage corresponding to the first concaved passage 1. While the rotation angle is set to about 90 degrees in the embodiment of the double-start thread shown in FIG. 5(D), it is set to about 60 degrees in the modification of the triple-start thread shown in this FIG. 9(B).

Each of the two concaved passages in the shape of the triple-start thread may be formed into a multi-stage structure. The multi-start thread may be a thread of at least quatre-start.

FIGS. 10(A), 10(B) and 10(C) show a second embodiment. This second embodiment is explained in principle with the same reference characters attached to the members of the same structures as those mentioned in the first embodiment.

This embodiment hermetically inserts the sleeve 37 between the guide bore 14 of the housing 13 and the clamp rod 15 and adapts the sleeve 37 so as to serve also as a piston. The detent pin 39 inhibits the sleeve 37 from rotating. A clamping spring 51 is attached to the first chamber 31 for clamping formed above the sleeve 37 of piston type and pressurized oil is adapted to be supplied to and discharged from the second chamber 32 for unclamping formed below the sleeve 37. The other construction is the same as that of the first embodiment.

In the retreated condition of FIG. 10(A), the pressurized oil (here a pressure of about 50 to 140 kgf/cm$^2$ 'about 5 to 14 Mpa') is supplied to the second chamber 32 to thereby raise the sleeve 37 and the clamp rod 15. An allowable stroke (M) is formed below an input portion 15c for clamping of the clamp rod 15.

When switching over a clamping apparatus from the retreated condition of FIG. 10(A) to the clamping condition of FIG. 10(C) via the unclamping condition of FIG. 10(B), the pressurized oil within the second chamber 32 is discharged through the supply and discharge port 26. Then an urging force of the clamping spring 51 lowers the sleeve 37 to produce within the second chamber 32 a predetermined back pressure (here a pressure of about 10 to 50 kgf/cm$^2$ 'about 1 to 5 Mpa').

The back pressure keeps the input portion 15c pushed to the stopper 42 through a thrust bearing 52 and a transmission plate 53 provided with a communication hole 54 in order. Thus the clamp rod 15 is rotated by the converting mechanism 44 while the sleeve 37 is descending. In other words, the back pressure within the second chamber 32 composes a pushing means (P) at the time of clamp rotation.

The pushing means (P) may include a weak pushing spring in addition to the back pressure within the second chamber 32 or comprise only a pushing spring.

And as shown in FIG. 10(B), the sleeve 37 descends by the rotation stroke (R) to bring its lower end surface into butting contact with the transmission plate 53 and thereby switch over the clamp rod 15 to the unclamping position (Y) Next, the urging force of the clamping spring 51 makes the sleeve 37 lower the input portion 15c for clamping, thereby switching over the clamp rod 15 to the clamping position (X) of FIG. 10(C). Thus the push bolt 17 fixes a workpiece (W) to the table 11. In FIG. 10(C) character (C) indicates the clamping stroke and character (A) designates the whole stroke produced by the clamping spring 51 when it extends.

When switching over from the clamping condition of FIG. 10(C) to the retreated condition of FIG. 10(A) via the unclamping condition of FIG. 10(B), the pressurized oil is supplied to the second chamber 32 through the supply and discharge port 26 in the clamping condition of FIG. 10(C).

Then a force of the pressurized oil acts on the clamp rod 15 and the sleeve 37. The pressurized oil force acting on a receiving area of the clamp rod 15 pushes up the sleeve 37 through the input portion 15c for clamping, the thrust bearing 52 and the transmission plate 53 in order and at the same time the pressurized oil force acting on an annular receiving area of the sleeve 37 pushes up the sleeve 37.

Thus the sleeve 37 moves upward against the clamping spring 51 and as shown in FIG. 10(B) the stopper 42 inhibits the input portion 15c from going up to switch over the clamp rod 15 to the unclamping position (Y), Subsequently, only the sleeve 37 moves upward relatively to the clamp rod 15 inhibited from going up, so that the converting mechanism 44 rotates the clamp rod 15 to the retreated position (z) shown in FIG. 10(A).

The first and second embodiments can be modified as follows.

The fluid to be supplied to or discharged from the first chamber 31 for clamping in the first embodiment or the second chamber 32 for unclamping in the second embodiment may be either other kinds of liquid or gas such as air instead of the pressurized oil.

The rotation angle (θ) of the clamp rod 15 may be set to a desired angle such as 60 degrees, 45 degrees or 30 degrees instead of the aforesaid about 90 degrees.

The clamping apparatus 12 may be of double-acting type instead of the illustrated single-acting type. In other words, it may be adapted so that a pressurized fluid can be supplied to or discharged from the second chamber 32 for unclamping in the first embodiment or the first chamber 31 for clamping in the second embodiment.

It is a matter of course that the transmission device (T) of the present invention may be utilized for a mechanism of opening and closing a ball valve or a butterfly valve or for other use instead of being employed for the above-mentioned mechanism of rotating the clamping apparatus 12.

FIG. 11(A) to FIG. 11(E) are schematic views for explaining concept of the transmission device according to the present invention.

Figure 11A:
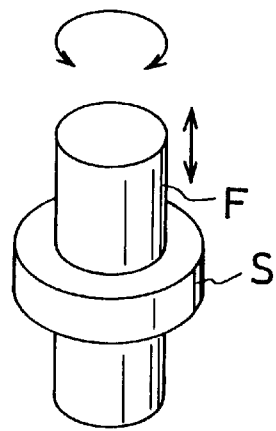
FIGS. 11(A) to 11(E) are respective schematic views for explaining concept of the various transmission devices according to the present invention.

FIG. 11(A) corresponds to the first embodiment (see FIG. 1). More specifically, the first member (F) is adapted so as to be rotatable and the second member (S) is adjusted so as not to be rotatable. This arrangement rotates the first member (F) by vertically pushing it relatively to the second member (S).

Figure 11B:
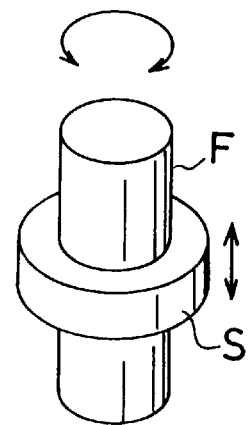

FIG. 11(B) corresponds to the second embodiment (see FIG. 10). More specifically, the first member (F) is adapted so as to be rotatable and the second member (S) is adjusted so as not to be rotatable. This arrangement rotates the first member (F) by vertically pushing the second member (S) relatively thereto.

Figure 11C:
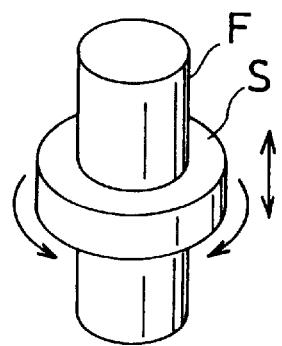

FIG. 11(C) shows an arrangement wherein the first member (F) is adapted so as not to be rotatable and the second member (S) is adjusted so as to be rotatable. This arrangement rotates the second member (S) by vertically pushing it relatively to the first member (F).

Figure 11D:
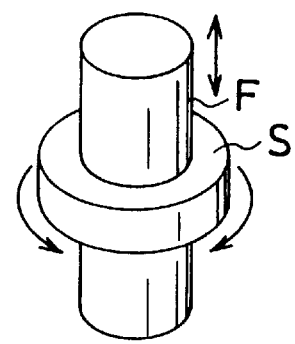

FIG. 11(D) shows an arrangement wherein the first member (F) is adapted so as not to be rotatable and the second member (S) is adjusted so as to be rotatable. This arrangement rotates the second member (S) by vertically pushing the first member (F) relatively thereto.

Figure 11E:
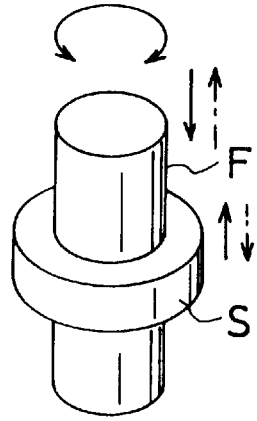

FIG. 11(E) shows an arrangement wherein the first member (F) is adapted to rotate by moving both of the first and second members (F) and (S) vertically and simultaneously. It is to be noted the simultaneous vertical movement may rotate the second member (s).

FIG. 12 illustrates a means for positioning on the table 11, the workpiece (W) to be fixed by the clamping apparatus.

This means comprises detachably attaching a jig plate 67 to an adapter plate 66 fixed to an upper surface of the table 11 and positioning the workpiece (W) on the jig plate 67 through a plurality of positioning pins 68. By rotating a shaft 69 supported by the adapter plate 66 with a hexagonal wrench 70, an eccentric pin 71 provided at an eccentric position of the shaft 69 vertically moves another positioning pin 72.

The jig plate 67 can be positioned with respect to the adapter plate 66 and fixed thereto by advancing the another pin 72 into a positioning hole 73 (here only one is illustrated) of the jig plate 67. Further, the jig plate 67 can be detached from the adapter plate 66 by retracting the another pin 72 from the positioning hole 73.

Thus it is possible to easily exchange the jig plate 67 depending on the kind of the workpiece (W).

The adapter plate 66 may be integrally formed with the table 11. Further, an object to be fixed by the clamping apparatus may be a metal mold or the like instead of the workpiece (W).

What is claimed is:

1. A transmission device for transmitting motion for a clamping device including a first member extending in a direction of an axis and a second member externally fitted onto the first member, the first member having an outer peripheral surface and the second member having an inner peripheral surface, which device comprises:

a first concaved passage comprising first spiral grooves in the shape of a multi-start thread and communication grooves, the first concaved passage being communicated in entirety of the outer peripheral surface of the first member and in the shape of sawtooth, each of the first spiral grooves being formed by about one pitch and having a terminal end and an initial end, a pair of the adjacent first spiral grooves having the terminal end communicated with the initial end through one of the communication grooves;

a second concaved passage comprising second spiral grooves and escape grooves, the second concaved passage being communicated in entirety of the inner peripheral surface of the second member, the second spiral grooves corresponding to the first spiral grooves and being spaced apart at a predetermined distance in a peripheral direction, the escape grooves corresponding to the communication grooves and being formed so as to extend in the peripheral direction;

a number of rolling balls being charged between the first concaved passage and the second concaved passage; and two of the first and second members being moved relatively to each other in the axial direction to thereby rotate either of them around the axis.

2. A transmission device as set forth in claim 1, wherein the first member is adapted to rotate by pushing it in the axial direction relatively to the second member.

3. A transmission device as set forth in claim 2, wherein each of the escape grooves of the second concaved passage has a peripheral edge portion provided with a stopper wall for receiving the rolling balls.

4. A transmission device as set forth in claim 2, wherein a housing has a guide bore formed therein so as to extend in the axial direction, a clamp rod inserted in the guide bore being adapted so as to be reciprocally movable in the axial direction, the clamp rod being provided with the first member, the clamp rod and the guide bore defining an annular space into which a sleeve is inserted so as to be axially movable but unrotatable around the axis, the sleeve being provided with the second member.

5. A transmission device as set forth in claim 1, wherein the first member is adapted to rotate by pushing the second member in the axial direction relatively thereto.

6. A transmission device as set forth in claim 5, wherein each of the escape grooves of the second concaved passage has a peripheral edge portion provided with a stopper wall for receiving the rolling balls.

7. A transmission device as set forth in claim 5, wherein a housing has a guide bore formed therein so as to extend in the axial direction, a clamp rod inserted in the guide bore being adapted so as to be reciprocally movable in the axial direction, the clamp rod being provided with the first member, the clamp rod and the guide bore defining an annular space into which a sleeve is inserted so as to be axially movable but unrotatable around the axis, the sleeve being provided with the second member.

8. A transmission device as set forth in claim 1, wherein each of the escape grooves of the second concaved passage has a peripheral edge portion provided with a stopper wall for receiving the rolling balls.

9. A transmission device as set forth in claim 8, wherein the stopper wall has a ball receiving surface, the ball receiving surface being formed so as to extend in the axial direction with a curvature radius which is substantially the same as a radius of the ball.

10. A transmission device as set forth in claim 1, wherein a housing has a guide bore formed therein so as to extend in the axial direction, a clamp rod inserted in the guide bore being adapted so as to be reciprocally movable in the axial direction, the clamp rod being provided with the first member, the clamp rod and the guide bore defining an annular space into which a sleeve is inserted so as to be axially movable but unrotatable around the axis, the sleeve being provided with the second member.

* * * * *